United States Patent

Gusik et al.

[11] Patent Number: 5,449,484
[45] Date of Patent: Sep. 12, 1995

[54] PROCESS AND DEVICE FOR PRODUCING EXTRUDATES FROM ULTRA-HIGH MOLECULAR WEIGHT POLYETHYLENE

[75] Inventors: Meinhard Gusik, Oberhausen; Rudolf Kellersohn, Hamminkeln, both of Germany

[73] Assignee: Hoechst Aktiengesellschaft, Germany

[21] Appl. No.: 128,814

[22] Filed: Sep. 29, 1993

[30] Foreign Application Priority Data

Oct. 1, 1992 [DE] Germany ............... 42 32 988.4

[51] Int. Cl.[6] ............................................ B29C 47/62
[52] U.S. Cl. ........................ 264/211.23; 264/143; 264/331.17; 264/349; 425/208; 425/379.1; 425/380; 425/464
[58] Field of Search ............ 264/211.21, 349, 211.23, 264/331.17, 143; 425/208, 206, 207, 379.1, 378.1, 380, 463, 464, 67

[56] References Cited

U.S. PATENT DOCUMENTS

| | | | |
|---|---|---|---|
| 3,486,192 | 12/1969 | Roy | 425/208 |
| 3,650,652 | 3/1972 | Dray et al. | 425/206 |
| 4,733,970 | 3/1988 | Yokana | 366/79 |
| 4,994,223 | 2/1991 | Hestehave et al. | 264/349 |
| 5,063,016 | 11/1991 | Bauer et al. | 425/208 |
| 5,234,652 | 8/1993 | Woodhams et a. | 264/331.17 |
| 5,290,498 | 3/1994 | Shiraki et al. | 264/331.17 |

FOREIGN PATENT DOCUMENTS

| | | | |
|---|---|---|---|
| 2669260 | 5/1992 | France . | |
| 1729373 | 7/1971 | Germany . | |
| 2311946 | 9/1974 | Germany . | |
| 2346032 | 3/1975 | Germany | 425/208 |
| 3630208 | 3/1987 | Germany . | |

*Primary Examiner*—Jeffery R. Thurlow
*Attorney, Agent, or Firm*—Jordan B. Bierman; Bierman and Muserlian

[57] ABSTRACT

For the production of extrudates such as profiles or granules, pulverulent or finely divided ultra-high molecular weight polyethylene is processed on single screw extruders. By the use of a screw with a specific geometry, thermal degradation of the polymer into low molecular weight products is avoided. Furthermore, profiles are obtained which have perfect surfaces, are free of voids and pores, and have no internal stresses.

17 Claims, 1 Drawing Sheet

U.S. Patent                Sep. 12, 1995                5,449,484
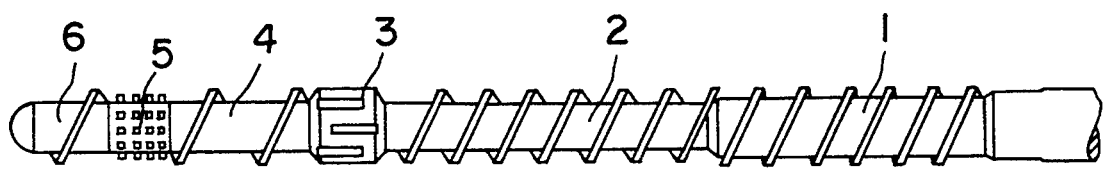

PROCESS AND DEVICE FOR PRODUCING EXTRUDATES FROM ULTRA-HIGH MOLECULAR WEIGHT POLYETHYLENE

This Application claims the priority of German Application P 42 32 988.4, filed Oct. 1, 1992.

The present invention relates to a process for extrusion of ultra-high molecular weight polyethylene (UPE) on screw extruders and a device for carrying out this process.

BACKGROUND OF THE INVENTION

UPE grades are linear polyethylenes obtained by the low pressure process and having an average molecular weight, measured by viscosimetry, of at least $1 \times 10^6$, in particular $2.5 \times 10^6$ to approximately $1 \times 10^7$. A process for determining such high molecular weights is described, for example, in CZ-Chemische Technik 4 (1974), 129 et seq.

UPE is distinguished by a range of physical characteristics which open it up to a variety of possible applications. Emphasis can be placed on its high wear resistance, its low coefficient of friction with respect to other materials, and its outstanding toughness. Furthermore, it is remarkably resistant to many chemicals. Because of its favorable mechanical, thermal, and chemical behavior, UPE has a wide variety of applications as a versatile material. Examples which can be quoted are the textile industry, mechanical engineering, the chemical industry, and mining.

The possible uses of this material are limited by the fact that its processing in ram extruders and the conventional single-screw or multi-screw extruders does not always lead to satisfactory results. In order to extrude UPE as gently as possible, i.e. without impairing its mechanical properties, ram extruders are widely used. Despite its many advantages, this processing method does not meet all requirements. In particular, the ram-stroke marks occurring on the molding are troublesome and not always acceptable.

The hollow bodies and profiles produced from UPE on screw extruders do not have these disadvantages. However, the polymer is greatly overheated, even at medium screw speeds. As a consequence of the high viscosity of the melt, which is only slightly reduced even with increased temperature, a very large proportion of the mechanical energy supplied to the screw is transformed by friction into heat. The heating of the material which this causes can lead to thermal damage to the plastic as a result of degradation or decomposition, i.e. by cleavage of the molecular chains, and thus to a reduction in the average molecular weight. Whereas the throughput, i.e. the amount of extrudate transported per unit time, increases approximately proportionally to the screw speed, the temperature increases at a rate which is disproportionately higher. For this reason, UPE can only be extruded on screw extruders of conventional design at low screw speed. However, the process then becomes uneconomical and unsuitable for many applications.

EP-A-01 90 878 discloses the processing of ultra-high molecular weight polyethylene in a single-screw extruder. The process consists in extruding molten UPE through a die with a length/diameter ratio of at least 10. The extrudates are taken off with a stretch ratio of at least 1, preferably 8 to 30:1. This method is only suitable for producing stretched filaments with small diameters at very low output rates.

SUMMARY OF THE INVENTION

The problem to be solved was, therefore, to discover conditions for the extrusion of UPE and to match them to one another such that the above-described disadvantages are avoided. This object is achieved by the present invention. It consists of a process for producing extrudates from pulverulent or small-particulate UPE with an average molecular weight, measured by viscosimetry, of at least $1 \times 10^6$ in a single-screw extruder, the screw shaft of which passes through a feed zone, a transition zone, and a metering or discharge zone. It is characterized in that the feed zone comprises a two-flight section; i.e. a transportation zone and decompression zone. The transition zone includes a shearing element and the metering zone comprises a mixing zone.

The new process not only ensures that the polymer is processed gently, i.e. without thermal degradation, but also profiles having perfect surfaces, free of voids and pores and without internal stresses, are obtained. The chosen screw geometry also ensures that the polymer is transported without disturbance over the entire speed range available to the extruder and is continuously fed to the shaping die. It permits a high material throughput and is correspondingly very economical.

The invention further relates to a device for carrying out the new process. It comprises a barrel tube in the bore of which a screw shaft is rotatably mounted and which is provided, in a coolable feed zone, with optional pockets or grooves extending in the longitudinal direction and which has a heatable transition zone and an adjoining die.

According to the invention, the UPE is used in a pulverulent or small-particulate form. By this is meant not only particles obtained in the polymerization process, but also particles, comminuted by mechanical treatment or other means or else agglomerated from fine particles, of the direct polymerization product.

The conveying of the UPE through the extruder takes place at temperatures of 140° to 300° C., preferably 160° C. to 180° C. The required heat is fed to the material in two ways: (1) internally due to mechanical stressing as frictional heat and (2) externally via heating devices.

DETAILED DESCRIPTION OF THE INVENTION

According to the invention, the feed zone is designed as a two-flight screw part and is subdivided into a feed transport zone and a decompression zone. In the first zone the thermoplastic is received, transported and compressed. The length of the feed transport zone is 4 to 16 times, preferably 4 to 8 times, the screw diameter. It is followed by the decompression zone in which, by changing the flight depth of the lands, decompression takes place. This zone has a length of 5 to 18 times, preferably 6 to 12 times, the screw diameter. The width of the lands is constant over the entire feed zone and is 0.05 to 0.09 times, preferably 0.055 to 0.065 times, the screw diameter. The ratio of the flight depth in the feed zone to the flight depth in the discharge zone is 0.6:1 to 1:1, preferably 0.68:1 to 0.76:1, the maximum flight depth over the entire length of the screw being 2.5 to 6, preferably 3.5 to 5 mm.

From the feed zone, the UPE, already heated above the crystallite melting range by frictional forces, passes into the transition zone which zone is formed by a shearing element of conventional design. Preferably the shearing element is provided with longitudinal grooves. In it, the melt stream flows through a defined shearing gap completing the plasticizing and homogenization of the thermoplastic. The length of the transition zone is 1 to 2.5 times, preferably 1.5 to 2 times, the screw diameter. The screw clearance, i.e. the distance of the shearing element from the barrel wall, is 0.20 to 0.50 ram, preferably 0.25 to 0.35 mm.

The material coming from the transition zone is received by the metering zone. In a proven embodiment of the new process, a first metering transport zone follows the transition zone. This first metering transport zone is a single-flight screw section and has a length of up to 4.5 times, preferably 3 to 4 times, the screw diameter. The land width is 0.08 to 0.15 times, in particular 0.10 to 0.12 times, the screw diameter. The first metering transport zone is followed by a mixing zone and its length is 1 to 4 times, in particular 2 to 3 times, the screw diameter. Preferably the mixing zone is formed by a screw part provided with knobs or pins.

It has proven suitable for the mixing zone also to be followed by a single-flight screw part as second metering transport zone. The length of the second metering transport zone is up to 2 times the screw diameter and the land width is 0.08 to 0.15 times, in particular 0.10 to 0.12 times, the screw diameter. After leaving the metering zone, wether via the mixing zone or via the second metering transport zone, the thermoplastic material is fed to the die.

BRIEF DESCRIPTION OF THE DRAWING

In the accompanying drawing, constituting a part hereof, and in which like reference characters indicate like parts, the single FIGURE is a schematic view of the device of the present invention with the barrel omitted.

DETAILED DESCRIPTION OF THE DRAWING

The device of the present invention comprises screw shaft 7 having feed zone 8, transition zone 3, and metering zone 9. Screw shaft 7 is mounted within a hollow barrel tube (not shown).

Feed zone 8 comprises transport zone 1, which has a length of 4 to 16, preferably 4 to 8, times the screw diameter; decompression zone 2 has a length which is 5 to 18, preferably 6 to 12, times the screw diameter. Transition zone 3 is formed by a shearing element, having a length which is 1 to 2.5, preferably 1.5 to 2, times the screw diameter. Metering zone 9 comprises mixing zone 5, the length of which is 1 to 4, preferably 2 to 3, times the screw diameter.

In proven embodiments of the new device, the metering transport zones take the form of single-flight screw sections, the lengths of which are, in first metering transport zone 4, up to 4.5, preferably 3 to 4, times the screw diameter and, in second metering transport zone 6, up to 2 times the screw diameter.

The device according to the invention is provided at the upstream end of feed transport zone 1 with a number of axial grooves distributed uniformly around the circumference of the barrel (not shown), which axial grooves, in the region of feed opening, can be enlarged to form pockets. The length of the grooves, which are preferably rectangular in cross section, is 3 to 3.5 times the screw diameter. They have a depth of 4.5 to 6 mm, in particular 5 to 5.5 mm, and a width of 5 to 8.5 mm, in particular 6 to 7 min. The number of grooves is dependent on the diameter of the screw. For a screw diameter of 150 mm, for example, there are 6 to 12, preferably 8 to 10.

In another proven embodiment of the new device, the pockets are 15 to 20 mm longer than the diameter of the screw and their depth is 2 to 4 mm, preferably 3 to 3.5 mm. The pockets merge into the grooves at an angle of 6° to 9°, preferably 7° to 8°. In order to ensure a continuous stream of pulverulent or small-particulate material, the feed opening should have a length of 1.4 to 1.8, preferably 1.5 to 1.6, times the screw diameter and its width should be approximately equal to the screw diameter or exceed it by up to 4 mm.

The material leaving the barrel is plasticized and fed to the shaping die (not shown). The die is provided with heating and cooling devices which permit heat to be supplied and/or removed in a controlled manner. The temperatures along the die are between 300° C. at the inlet and 130° C. at the end, preferably between 180° and 140° C. In the direction of the die outlet, the cross section of the flow channel tapers. This results in a pressure rise in the die land, which pressure rise is accommodated by a corresponding adjustment of the cross-sectional size such that the thermoplastic particles sinter together into a homogeneous mass and the moldings exhibit a smooth surface.

The extrudate emerging from the die is led into a cooling die in which its surface is cooled down to temperatures below the crystallite melting point, i.e. below approximately 130° C. After leaving the cooling die, the moldings are guided by appropriate devices, e.g. braking lips, braking flaps, or other suitable measures, such that a force acting opposite to the extrusion direction results. This force ensures, in the cooling zone, that the molding comes into contact on all sides with the coolant separated from it by a wall, so that the heat removal takes place uniformly and the occurrence of stresses in the molding is avoided. Further cooling takes place, corresponding to the prior art, in a water bath which is uniformly temperature controlled or subdivided into different temperature zones.

In a special embodiment of the device for carrying out the process, the extrudate is shaped into strands by means of an apertured plate. The thickness of the apertured plate is conventionally 10 to 50 mm, preferably 30 to 40 mm, and the bores have diameters of 1.5 to 5 mm, in particular 2 to 4 mm. They are expediently equipped with conical inlets, the inlet angle being 0.5° to 5° preferably 0.8° to 1.5°. The strands emerging from the apertured plate are pelletized by means of conventional commercial pelletizing devices, such as strand pelletizers, hot-cut pelletizers, water-cooled die face pelletizers, or underwater pelletizers.

While only a limited number of specific embodiments of the present invention have been expressly disclosed, it is, nonetheless, to be broadly construed and not to be limited except by the character of the claims appended hereto.

What we claim is:

1. A process for the production of extrudates from polyethylene having an average molecular weight, measured by viscosimetry, of at least $1 \times 10^6$, said process being carried out in a cylindrical extrusion chamber containing a screw shaft extending substantially axially therethrough and having a screw diameter, said process comprising introducing said polyethylene into a feed zone having a two-flight section, located at an upstream end of said chamber, said feed zone comprising a feed transport zone and, downstream thereof, a decompression zone, said feed transport zone having a feed transport length of 4 to 16 times said screw diameter, said decompression zone having a decompression length of 5 to 18 times said screw diameter, passing said polyethylene through said feed transport zone and then through said decompression zone to form decompressed polyethylene, transferring said decompressed polyethylene from said decompression zone into a transition zone and subjecting said decompressed polyethylene to shear in said transition zone to produce sheared polyethylene, said transition zone having a shearing length of 1 to 2.5 times said screw diameter, moving said sheared polyethylene into a mixing zone of a metering zone, said mixing zone having a mixing length of 1 to 4 times said screw diameter, mixing said sheared polyethylene in said mixing zone to form mixed polyethylene, thereafter discharging said mixed polyethylene from said metering zone, wherein a ratio of a flight depth in said feed zone to a flight depth in said metering zone is from 0.6:1 to 1:1.

2. The process of claim 1 wherein said feed transport length is 4 to 8 times said screw diameter, said decompression length is 6 to 12 times said screw diameter, said shearing length is 3.5 to 2 times said screw diameter, and said mixing length is 2 to 3 times said screw diameter.

3. The process of claim 1 wherein, after leaving said transition zone, said sheared polyethylene is passed into a first metering transport zone having a first metering transport length of up to 4.5 times said screw diameter.

4. The process of claim 3 wherein said first metering transport length is 3 to 4 times said screw diameter.

5. The process of claim 1 wherein, after leaving said mixing zone, said mixed polyethylene is passed into a second metering transport zone having a second metering transport length of up to 2 times said screw diameter.

6. An apparatus for extrusion of polyethylene having an average molecular weight of at least $1 \times 10$ comprising a substantially cylindrical barrel tube with an axial bore therethrough, said bore having a longitudinal axis and an inner surface, a screw shaft having a screw diameter rotatably mounted therein and substantially coincident with said axis;

said apparatus having a feed zone adjacent an upstream end and, a transition zone downstream of said feed zone, and a metering zone downstream of said transition zone, said barrel tube having indentations in said inner surface which extend substantially parallel to said axis, said indentations being located in said feed zone;

a feed portion of said screw shaft within said feed zone having a feed transport flight in a feed transport zone adjacent said upstream end, a decompression portion of said screw shaft within said feed zone having a decompression flight in a decompression zone downstream of said feed transport flight, a shearing portion of said screw shaft within said transition zone having a shear flight downstream of said decompression flight, a mixing portion of said screw shaft within said metering zone having a mixing flight in a mixing zone downstream of said shear flight, said feed transport flight having a feed transport length of 4 to 16 times said screw diameter, said decompression flight having a decompression length of 5 to 18 times said screw diameter, said shear flight having a shear flight length of 1 to 2.5 times said screw diameter, and said mixing flight having a mixing flight length of 1 to 4 times said screw diameter.

7. The apparatus of claim 6 wherein said feed transport length is 4 to 8 times said screw diameter, said decompression length is 6 to 12 times said screw diameter, said shear length is 1.5 to 2 times said screw diameter, and said mixing flight length is 2 to 3 times said screw diameter.

8. The apparatus of claim 1 wherein said indentations are pockets and/or grooves.

9. The apparatus of claim 6 wherein there is a first metering transport zone downstream of said transition zone and upstream of said mixing zone, said screw shaft having a first metering transport flight within said metering transport zone, said first metering transport flight having a first metering transport length of up to 4.5 times said screw diameter.

10. The apparatus of claim 9 wherein said first metering transport zone is 3 to 4 times said screw diameter.

11. The apparatus of claim 6 wherein there is a second metering transport zone downstream of said mixing zone, said screw shaft having a second metering transport flight within said second metering transport zone, said second metering transport flight having a second metering transport length of up to 2 times said screw diameter.

12. The apparatus of claim 8 wherein said grooves are rectangular in cross section, are 3.0 to 3.5 times said screw diameter in length, have a groove depth of 4.5 to 6.0 mm and a groove width of 5.0 to 8.5 min.

13. The apparatus of claim 12 wherein said groove depth is 5.0 to 5.5 mm and said groove width is 6.0 to 7.0 min.

14. The apparatus of claim 8 wherein said pockets are 15 to 20 mm longer than said screw diameter and have a pocket depth of 1.0 to 4.0 mm.

15. The apparatus of claim 14 wherein said pocket depth is 3.0 to 3.5 min.

16. The apparatus of claim 6 wherein there is a die downstream of said metering zone, said die comprising an apertured plate having a plate thickness of 10 to 50 mm and holes therethrough of 1.5 to 5.0 mm in diameter.

17. The apparatus of claim 16 wherein said plate thickness is 30 to 40 mm and said boles are 2.0 to 4.0 mm in diameter.

* * * * *